A. C. CRUMP.
TRANSPARENT COLLAPSIBLE BOTTLE OR OTHER CONTAINER.
APPLICATION FILED JUNE 26, 1917.
1,272,921.
Patented July 16, 1918.
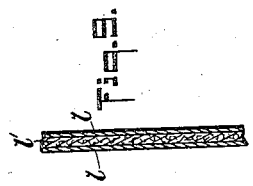
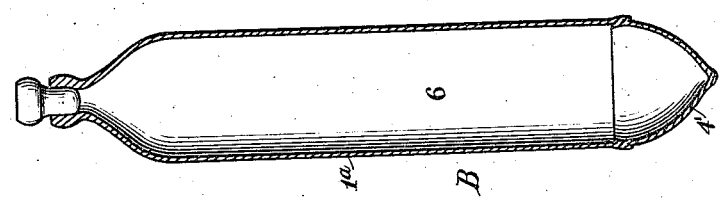
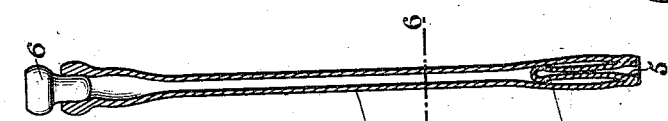
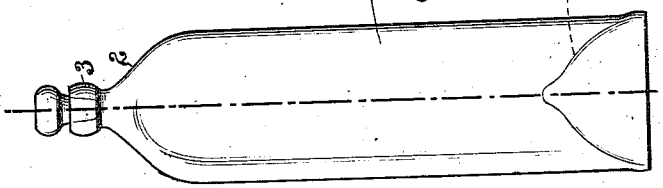
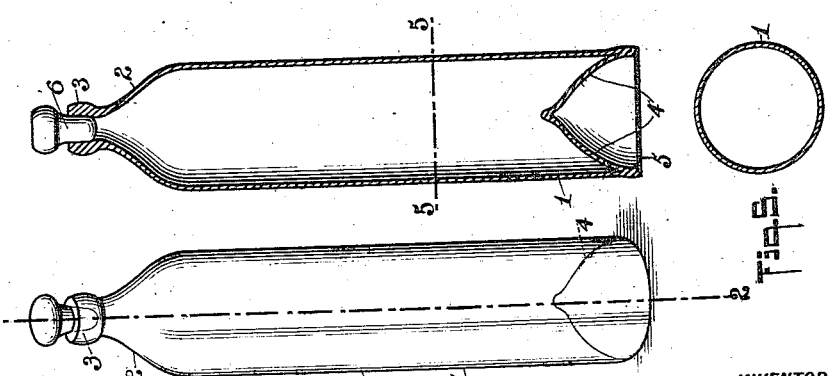
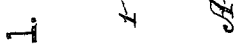
WITNESSES
INVENTOR
A.C.Crump
BY
ATTORNEYS

UNITED STATES PATENT OFFICE.

ARMISTEAD C. CRUMP, OF NEW YORK, N. Y.

TRANSPARENT COLLAPSIBLE BOTTLE OR OTHER CONTAINER.

1,272,921. Specification of Letters Patent. Patented July 16, 1918.

Application filed June 26, 1917. Serial No. 176,995.

*To all whom it may concern:*

Be it known that I, ARMISTEAD C. CRUMP, a citizen of the United States, and a resident of the city of New York, borough of Manhattan, in the county and State of New York, have invented a new and Improved Transparent Collapsible Bottle or other Container, of which the following is a full, clear, and exact description.

This invention relates to containers, and deals particularly with bottles or tubes characterized by the entire body of the container being pliable or collapsible.

The invention has for its general objects to provide a collapsible container which is made of transparent pliable material which will not injuriously affect the contents, as is liable with containers made of metal.

A further object of the invention is the provision of a container which is flexible both at the bottom and neck as well as being flexible throughout the length of the body, so that danger of breakage and loss of the contents is obviated.

Still a further object of the invention is to provide a bottle which has an expansible mouth into which is fitted a non-yielding stopper, whereby an effective seal is made possible.

With such objects in view, and others which will appear as the description proceeds, the invention comprises various novel features of construction and arrangement of parts which will be set forth with particularity in the following description and claim appended hereto.

In the accompanying drawing which illustrates certain embodiments of the invention and wherein similar characters of reference indicate corresponding parts in all the views, Figure 1 is a perspective view of a bottle or container with a reëntrant bottom;

Fig. 2 is a vertical section thereof on the line 2—2, Fig. 1;

Fig. 3 is a side view of the bottle collapsed;

Fig. 4 is a vertical section on the line 4—4, Fig. 3;

Fig. 5 is a horizontal section on the line 5—5, Fig. 2;

Fig. 6 is a sectional view on the line 6—6, Fig. 4;

Fig. 7 is a vertical section with the bottom extended;

Fig. 8 is a section of the tube collapsed; and

Fig. 9 is an enlarged view of the wall of the container.

Referring to the drawing, A designates a bottle which has its body 1, neck 2 and mouth 3 made of a single piece of celluloid which is flexible, tough, transparent and not readily affected chemically by materials ordinarily put up in bottles and tubes. The bottom 4 of the body is made conical or pointed and is set into the body 1 in reëntrant relation thereto. Before the bottom 1 is inserted its marginal portion 5 is dipped in cement, which causes the bottom and body 1 to become integrally connected. This bottom 4 is made of the same material as the body, and hence the bottom of the bottle can be collapsed, as shown in Figs. 3 and 4. The mouth 3 is flexible so that the stopper 6 may be made of glass or other suitable material which is incompressible, and when the stopper is inserted, the mouth stretches and the tension or elasticity causes a tight joint to be produced. The celluloid from which the bottle or bottom is made is preferably constructed of layers, as shown in Fib. 9, wherein the outer or surface layers 1 are of hard celluloid and the inner layer 1' of soft celluloid. These layers are cemented together in the process of forming the tube from which the bottles are shaped.

The collapsible tube B can be made by having the bottom 4' extending from the body 1ª, as shown in Figs. 7 and 8. The bottom 4' is united with the body of the tube by being cemented thereto, as in the case of the bottle. The tube is collapsible, so that it is especially adapted for paste, which can be extruded by compressing the walls of the tube. If desired, the container can be filled from the bottom end before the bottom is cemented thereto, which is especially advantageous for viscous material which could not be filled into the container through the restricted mouth.

From the foregoing description taken in connection with the accompanying drawing, the advantages of the construction and method of operation will be readily understood by those skilled in the art to which the invention appertains, and while I have described the principle of operation, together with the article which I now consider to be the best embodiment thereof, I desire to have it understood that the article shown is merely illustrative and that such changes may be made when desired as fall within the scope of the appended claim.

Having thus described my invention, I claim as new and desire to secure by Letters Patent:

A container comprising a separately formed collapsible resilient tubular body and a separately formed collapsible resilient conical bottom telescopically engaged in the body and permanently fastened thereto.

ARMISTEAD C. CRUMP.